(12) United States Patent
Narayanan et al.

(10) Patent No.: US 7,697,534 B1
(45) Date of Patent: Apr. 13, 2010

(54) VIRTUAL PRIVATE LAN SERVICE NETWORKS WITH MIXED MODE NETWORK DEVICES

(75) Inventors: Ashok Narayanan, Lexington, MA (US); Richard Bradford, Westford, MA (US); George Swallow, Boston, MA (US); Ali Sajassi, San Ramon, CA (US); Samer Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 166 days.

(21) Appl. No.: 12/148,340

(22) Filed: Apr. 18, 2008

(51) Int. Cl.
*H04L 12/56* (2006.01)
(52) U.S. Cl. .................. 370/392; 370/401; 370/465; 709/249
(58) Field of Classification Search .............. None
See application file for complete search history.

(56) References Cited

U.S. PATENT DOCUMENTS

| | | | |
|---|---|---|---|
| 2004/0037279 A1 | 2/2004 | Zelig et al. | |
| 2006/0233167 A1* | 10/2006 | McAllister et al. | 370/389 |
| 2008/0172497 A1* | 7/2008 | Mohan et al. | 709/249 |
| 2008/0186965 A1* | 8/2008 | Zheng et al. | 370/389 |
| 2009/0073997 A1* | 3/2009 | Teng | 370/401 |
| 2009/0161669 A1* | 6/2009 | Bragg et al. | 370/389 |
| 2009/0168783 A1* | 7/2009 | Mohan et al. | 370/395.5 |

OTHER PUBLICATIONS

Wei, Cao; "IEEE 802.1ah Mode for Ethernet Over MPLS"; Oct. 16, 2006; IETF Network Working Group; pp. 1-10.*
L. Martini et al.,"Encapsulation Methods for Transpot of Ethernet over MPLS Networks", IETF RFC 4448, Apr. 2006.

* cited by examiner

*Primary Examiner*—Hong Cho
*Assistant Examiner*—Robert C Scheibel
(74) *Attorney, Agent, or Firm*—Cindy Kaplan

(57) ABSTRACT

In one embodiment, a method generally includes identifying at a local Virtual Private LAN Service Provider Edge (VPLS PE) device whether remote VPLS PE devices are configured for operation as a Provider Backbone Bridge (PBB), negotiating pseudowire connections with the remote VPLS PE devices based on identification of the remote VPLS PE device configuration, receiving a frame destined for one of the remote VPLS PE devices, and transmitting the frame in a format compatible with the remote VPLS PE device. The local VPLS PE is configured for operation as a PBB and at least one of the remote VPLS PE devices is not configured for operation as a PBB. An apparatus for use in mixed mode VPLS network is also disclosed.

20 Claims, 4 Drawing Sheets

VIRTUAL PRIVATE LAN SERVICE NETWORKS WITH MIXED MODE NETWORK DEVICES

BACKGROUND OF THE INVENTION

The present disclosure relates generally to communication networks, and more particularly to Virtual Private LAN (Local Area Network) Service (VPLS) networks.

Many service providers are seeking to incorporate transport technologies which enable them to reduce capital expenses and operation expenses in their next generation networks. Ethernet transport can reduce expenses since it is already used in many networking products. Draft standard IEEE 802.1 ah, entitled "Provider Backbone Bridges", has been developed to address some of the internetworking issues with conventional Ethernet networking.

Currently, VPLS core networks with Ethernet aggregation networks using IEEE 802.1Q ("Local and Metropolitan Area Networks—Virtual Bridged Local Area Networks", 2005) or IEEE 802.1 ad ("Local and metropolitan area networks—Virtual Bridged Local Area Networks—Amendment 4: Provider Bridges", 2005) are commonly used. With conventional systems, if there is a combination of IEEE 802.1 ad and IEEE 802.1 ah aggregation networks connected via the VPLS core, all of the provider edge (PE) devices need to be upgraded to be compatible with the IEEE 802.1 ah standard.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
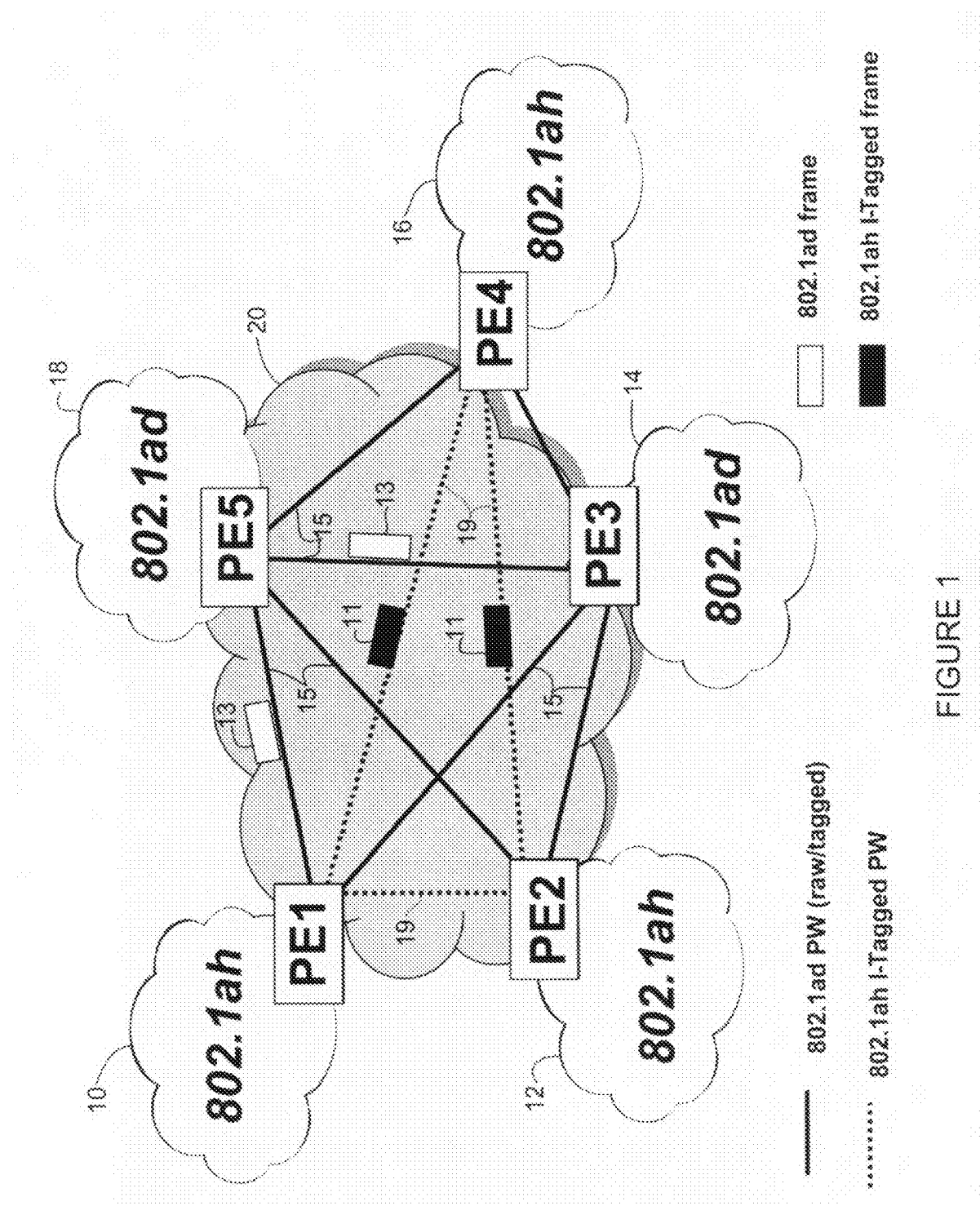
FIG. 1 illustrates an example of a mixed VPLS topology network in which embodiments described herein may be implemented.

A method and apparatus for use in VPLS networks with mixed mode network devices are disclosed. In one embodiment, a method generally comprises identifying at a local Virtual Private LAN Service Provider Edge (VPLS PE) device whether remote VPLS PE devices are configured for operation as a Provider Backbone Bridge (PBB), negotiating pseudowire connections with the remote VPLS PE devices based on identification of the remote VPLS PE device configuration, receiving a frame destined for one or more of the remote VPLS PE devices, and transmitting the frame in a format compatible with the remote VPLS PE device. The local VPLS PE is configured for operation as a PBB and at least one of the remote VPLS PE devices is not configured for operation as a PBB.

In another embodiment, a local Virtual Private LAN Service Provider Edge (VPLS PE) device is configured for operation as a Provider Backbone Bride (PBB) and is in communication with remote VPLS PE devices. At least one of the remote VPLS PE devices is not configured for operation as a PBB. The local VPLS PE device generally comprises a processor configured to identify whether remote VPLS PE devices are configured for operation as a PBB, negotiate a pseudowire connection with the remote VPLS PE devices based on identification of the remote VPLS PE device configuration, receive a frame destined for one or more of the remote VPLS PE devices, and transmit a frame in a format compatible with the remote VPLS PE device. The local VPLS PE device further comprises memory for storing the configuration of each of the remote VPLS PE devices.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Embodiments described herein allow for the use of provider edge devices configured for operation as a Provider Backbone Bridge (PBB) (e.g., in accordance with a standard such as IEEE 802.1 ah) to operate in a mixed Virtual Private LAN (Local Area Network) Service (VPLS) or H-VPLS (Hierarchical VPLS) network which also contains provider edge devices configured for operation in accordance with other standards (e.g., IEEE 802.1 ad or 802.1Q).

Provider Backbone Bridges as currently defined in 802.1 ah, offer a scalable solution for service providers to build large bridged networks. PBB introduces hierarchical network architecture with associated new frame formats which extend the work completed by Provider Bridges (802.1ad). In the PBB architecture, customer networks (using 802.1Q bridging) are aggregated into provider bridge networks (using 802.1ad). These in turn are aggregated into Provider Backbone Bridge Networks (PBBNs) which utilize the 802.1ah frame format. The frame format employs a MAC tunneling encapsulation scheme for tunneling customer Ethernet frames within provider Ethernet frames across the PBBN. A VLAN identifier (B-VID) is used to segregate the backbone into broadcast domains and a service identifier (I-SID) is used to associate a given customer MAC frame with a provider service instance.

Currently, VPLS core networks are typically used with Ethernet aggregation networks using IEEE 802.1Q or IEEE 802.1ad. It is desired to define a model where the aggregation network runs IEEE 802.1 ah and the core runs VPLS. In conventional networks, when there is a mix of 802.1 ad and 802.1 ah aggregation networks connected via the VPLS core, all the VPLS Provider Edge (PE) devices need to be modified to make them 802.1ah capable. Thus, conventional systems require all or nothing with regard to migration of the VPLS PE devices.

One possible approach is to retain the VPLS as 802.1 ad, implement 802.1 ah solely within the aggregation networks, and convert back to 802.1 ad before entering the VPLS network. This is easy to implement, however, offers very few of the scalability advantages that 802.1 ah provides to VPLS.

Another possible solution is to use 802.1 ah capable PE devices in all of the aggregation networks so that only 802.1 ah frames are sent over the VPLS core. VPLS PE devices connected to 802.1 ad networks are then responsible for 802.1 ah encapsulation before sending the traffic over the VPLS core. This offers good scalability for the VPLS PE devices, but requires that all of the VPLS PE devices are 802.1 ah capable.

The embodiments described herein utilize a mixed mode VPLS network which allows the migration to be done gradually so that only the PE devices for 802.1 ah aggregation networks need to have 802.1ah capability. The 802.1ah PE devices are backward compatible with existing PE devices that are not 802.1ah capable. The VPLS network thus includes nodes operating in a first mode (e.g., 802.1ah compatible) and nodes operating in a second mode (e.g., 802.1 ad compatible). This eases the migration and interoperability of 802.1 ad and 802.1 ah aggregation networks around a single VPLS core network. The mixed mode VPLS is configured to carry both 802.1 ad and 802.1ah encapsulated frames. Thus, as VPLS PE devices are upgraded for a network, all other existing PE devices can remain in their current configuration. The embodiments described herein thus support a mixed mode of new and existing PE devices per VPLS instance and allow for a smooth migration from 802.1 ad to 802.1 ah over a VPLS core. Networks may continue to operate with a combination of 802.1 ad compatible devices and 802.1ah compatible devices in cases where continued operation in mixed mode is desired. For example, some aggregation networks may remain 802.1 ad networks, without performing the full migration to 802.1 ah. In some cases, providers may choose to upgrade their larger aggregation networks first to provide scalability benefits.

Referring now to the drawings, and first to FIG. 1, an example of a mixed mode VPLS topology network in which embodiments described herein may be implemented is shown. The embodiments described herein operate in the context of a data communication network including multiple network devices. Some of the devices in the network may be switches (e.g., access switch, aggregation switch), bridges, gateways, or other network devices. As shown in FIG. 1, the network device may be a VPLS PE device. The network device may include, for example, a master central processing unit (CPU), memory, interfaces, and a bus. In one embodiment, the network device is implemented on a general purpose network host machine as described below with respect to FIG. 4.

The network illustrated in FIG. 1 is a mixed pseudowire VPLS topology network comprising five Ethernet aggregation networks 10, 12, 14, 16, 18. The network shown in FIG. 1 may have originally comprised five Ethernet aggregation networks using 802.1 ad. In this case, a provider wanted to upgrade (migrate) three of these networks to 802.1 ah without upgrading the other two networks. Thus, aggregation networks 10, 12, and 16 were upgraded to 802.1 ah, while networks 14 and 18 remain as 802.1 ad networks. Using the embodiments described herein, the provider can upgrade only the PE devices connected to networks 10, 12, and 16, while leaving the PE devices connected to networks 14 and 18 intact.

As shown in FIG. 1, networks 10, 12, and 16 each comprise a provider edge device, PE1, PE2, PE4, respectively, configured to operate in accordance with 802.1 ah. Networks 14 and 18 each comprise provider edge nodes PE3 and PE5, respectively, configured to operate in accordance with 802.1ad. For simplification, only the provider edge nodes are shown. The nodes are interconnected in a VPLS core network (e.g., MPLS network) 20, which is configured to carry both 802.1 ad and 802.1ah frames.

The term "Provider Backbone Bridge (PBB)" as used herein refers to nodes (e.g., PE1, PE2, and PE4) that are configured to operate as a PBB in accordance with a standard such as 802.1 ah. The term "Provider Bridge (PB)" as used herein refers to devices such as PE3 and PE5 that are not configured to operate as a PBB, and instead operate in accordance with a standard such as 802.1 ad and may also include devices configured in accordance with other standards such as 802.1Q, for example.

Each of the provider edge nodes (PE1, PE2, PE3, PE4, PE5) are interconnected with pseudowires. In one embodiment, pseudowires 15 interconnecting the 802.1 ad nodes (PE3, PE5) or the 802.1 ad nodes with the 802.1 ah nodes (PE1, PE2, PE4) operate in tagged mode (0x0004) or raw mode (0x0005) (Type 4 or Type 5 pseudowires). These pseudowires 15 may be configured to transfer VLAN tagged or untagged frames 13. For example, S-Tagged frames may be used. S-Tag refers to a field defined in 802.1 ad Q in Q encapsulation header that conveys the service VLAN identifier information (S-VLAN). Pseudowires 19 interconnecting the 802.1 ah nodes (PE1, PE2, PE4) are I-Tagged pseudowires. The I-Tagged pseudowires are configured for transmitting I-Tagged frames 11. I-Tag refers to a field defined in 802.1 ah provider MAC encapsulation header that conveys the service instance information (I-SID) associated with the frames.

Frames between two PE devices on a pseudowire are preferably always consistent (e.g., 802.1 ad or 802.1 ah). Different pseudowire/PE pairs can communicate using different encapsulation (e.g., 802.1 ad or 802.1ah) between a local VPLS PE device and a remote VPLS PE device. It is to be understood that the terms "local" and "remote" as used herein refer to two devices in communication over a communication link (e.g., pseudowire) and that either device may be referred to as the local or remote device.

The network shown in FIG. 1 is only one example and embodiments described herein may be implemented in networks having different configurations and different types or number of nodes, without departing from the scope of the invention. Also, there may be additional aggregation or access networks connected to the core network or interposed between the core network and another network.

Figure 2:
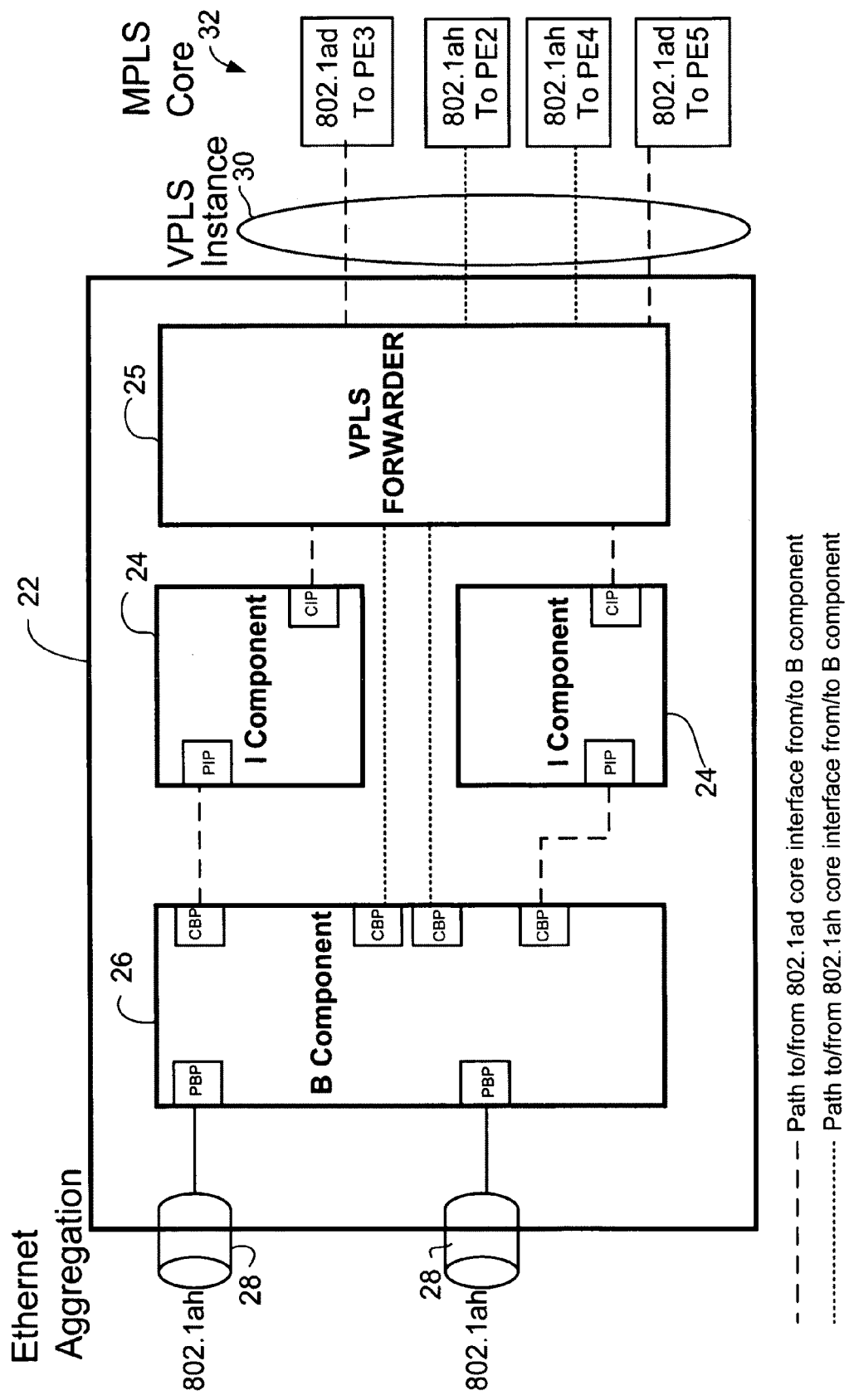
FIG. 2 illustrates an example of a bridge module of a network device for use in the network of FIG. 1.

FIG. 2 illustrates an example of a bridge module 22 of provider edge device PE1. The 802.1 ah capable PE device supports a mix of I-tagged PWs (Pseudowires) and conventional PWs per VPLS instance, as required. The module 22 includes two I-components 24 and one B-component 26. The I-component 24 provides bridging in customer space (C-MAC, S-VLAN) and the B-component 26 provides bridging in provider space (B-MAC, B-VLAN). Interfaces 28 are configured for sending and receiving 802.1ah frames to and from an aggregation network. Interfaces 32 are configured for sending 802.1 ad or 802.1ah frames carried over the VPLS pseudowires at a single VPLS instance 30.

The VPLS PE embodiment shown in FIG. 2 also includes a VPLS forwarder 25 for encapsulating 802.1ah frames and decapsulating MPLS packets (including MPLS encapsulated 802.1ah and 802.1ad frames) carried over MPLS pseudowires.

The B-component 26 includes Provider Backbone Ports (PBPs) for communication with the access ports 28. The B-component also includes Customer Backbone Ports (CBPs) for communication with the I-components 24 and the VPLS forwarder 25. The I-components each include a Provider Instance Port (PIP) which is connected to the CBP of the B-component, and a Customer Instance Port (CIP) which is connected to the VPLS forwarder 25.

When PE1 receives a frame destined for PE3 or PE5 (802.1 ad (PB) node) the device functions as an IB-BEB (Backbone Edge Bridge) containing an I-component for bridging in the customer space and a B-component for bridging the provider's backbone space. When PE1 receives a frame from 802.1 ah interface 28 destined for PE2 or PE4 (802.1 ah (PBB) node), the device functions as a B-BEB (Backbone Edge Bridge). The B-BEB contains a B-component that supports bridging in the provider backbone based on a B-MAC (backbone destination MAC address field defined in the 802.1 ah provider MAC encapsulation header) and B-Tag information. Frames received from the core (interface 32) from PE3 or PE5 (802.1ad) are sent to the I-component and then to the B-component before being transmitted to the access/aggregation network at interface 28. Frames received from the core from PE2 or PE4 (802.1 ah) are sent to the B-component and then to the interface 28 for transmittal to the access/aggregation network. Thus, frames received over a pseudowire in the MPLS core network from an 802.1 ah network are sent directly to the B-component, whereas frames received from an 802.1 ad network pass through both the I-component and the B-component.

It is to be understood that the configuration shown in FIG. 2 is only one example and that other configurations may be used. For example, the device may include only one I-component or more than two I-components and may include additional types of components or a different arrangement of components.

Figure 3:
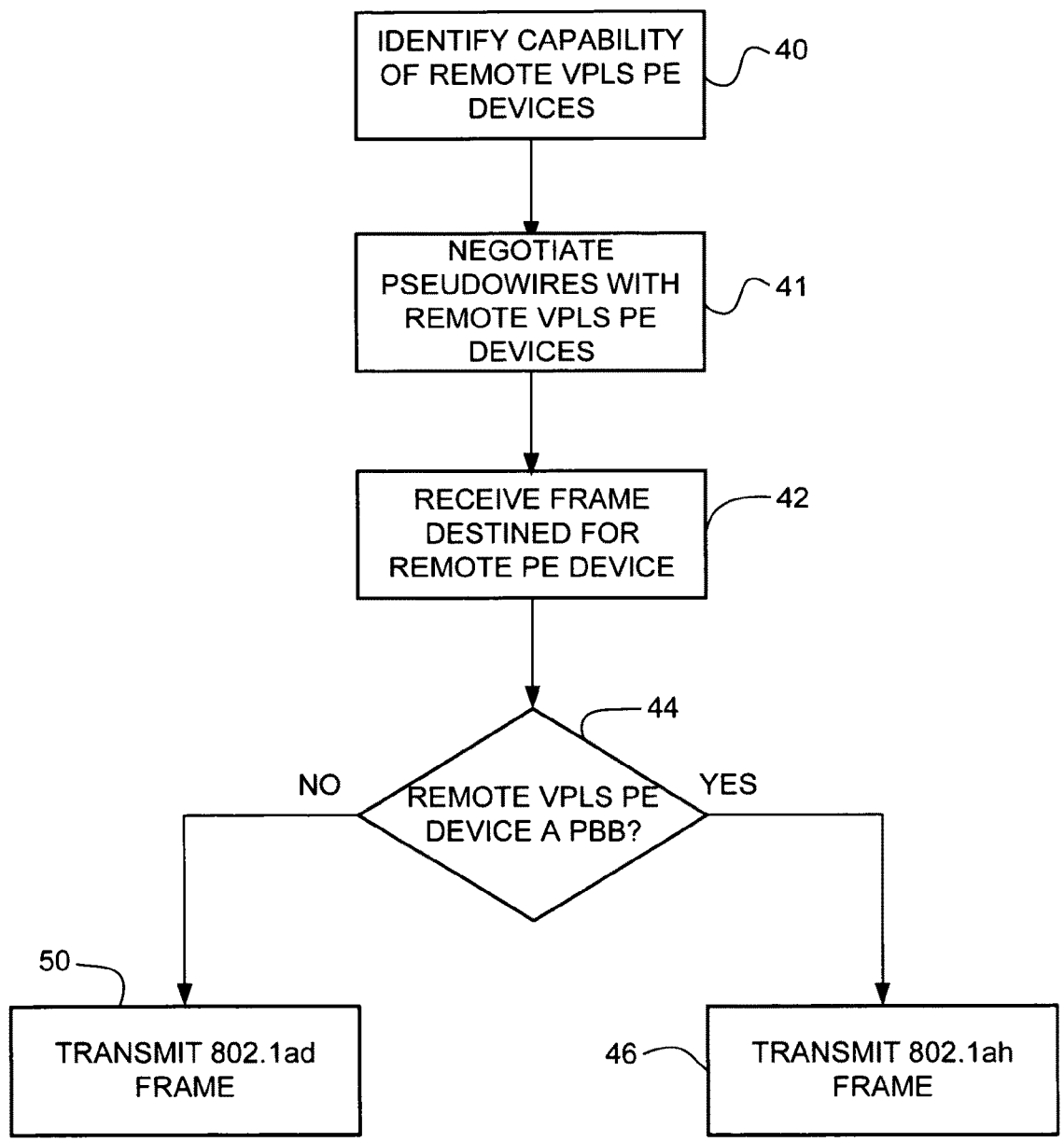
FIG. 3 is a flowchart illustrating a process for transmitting data from an IEEE 802.1 ah compatible node in the mixed VPLS topology network of FIG. 1.

FIG. 3 is a flowchart illustrating a process for transmitting data from an 802.1 ah compatible node in the mixed VPLS topology network of FIG. 1. At step 40, a local VPLS PE device (e.g., PE1) identifies the capability of remote VPLS PE devices (e.g., PE2, PE3, PE4, PE5) on the network that will be receiving frames from the local PE device. Referring to FIG. 1, PE1 identifies PE2 and PE4 as Provider Backbone Bridges (PBBs) (e.g., 802.1 ah capable). PE1 identifies that PE3 and PE5 are not PBBs (e.g., not 802.1 ah capable). The local VPLS PE device identifies whether remote VPLS PE devices are configured for operation as a PBB by static configuration or via dynamic discovery. For example, this identification may be performed utilizing extensions to an auto-discovery process. A BGP (Border Gateway Protocol) auto-discovery attribute may be used to identify the node configuration/capability. The VPLS auto-discovery allows each PE device to indicate to all other PE devices whether or not it is 802.1 ah capable. In another embodiment, 802.1 ah capabilities are identified during pseudowire negotiation between two nodes. Pseudowire negotiation may be performed using LDP (Label Distribution Protocol) or BGP, for example. As new networks are upgraded, PE devices can advertise themselves as 802.1 ah capable, and other upgraded PE devices can now send 802.1ah frames directly to these upgraded devices.

The remote PE device may notify the local device of its specific configuration (e.g., 802.1 ah, 802.1 ad, 802.1Q) or may just identify whether or not the node is configured to operate as a PBB (e.g., in accordance with 802.1 ah), in which case the local PE device may then use a default frame format for any remote PE device that is not 802.1 ah capable.

Based on the identification process of step 40, PE1 knows that PE2 and PE4 are 802.1ah capable and that PE3 and PE5 are not 802.1 ah capable. All PE devices negotiate the correct type of pseudowire among themselves based on the node identification (step 41). For example, when a local PE device has 802.1ah capability and it discovers that the remote PE device is also capable of 802.1 ah operation, it may use an I-tagged PW (pseudowire) type while mapping a single service instance to a VPLS instance. The PE devices that do not have 802.1 ah capability can negotiate conventional PW types (e.g., raw mode or tagged mode) with its peer.

At step 42, PE1 receives from the access/aggregation network a frame destined for one of the remote provider edge devices in the VPLS network. If the frame is destined for PE2 or PE4 (802.1 ah node) the device encapsulates an I-tagged frame (if required) and transmits the 802.1 ah I-tagged frame on the pseudowire as an 802.1 ah encapsulated frame (steps 44 and 46). For these frames, PE1 functions as a B-BEB, as previously described.

When PE1 receives a frame destined for PE3 or PE5 (802.1 ad node), it sends the frame as an 802.1ad frame (steps 44 and 50). For these frames PE1 functions as an IB-BEB, as described above.

When PE1 receives a frame over the VPLS from one of the remote PE devices, it knows which pseudowire it came over and can apply the reverse transform. When PE1 receives 802.1ad frames from PE3 and PE5 the device encapsulates the frames in an 802.1 ah frame before transmitting the frames into the aggregation network. Communication between PE3 and PE5 is not changed from its operation prior to upgrade of nodes PE1, PE2, and PE4.

It is to be understood that the process described above is only one example and that steps may be added or removed without departing from the scope of the invention. Steps may also be reordered or combined. For example, the local PE device may identify the capability of a remote PE device (step 40) during pseudowire negotiation (step 41). Also, as previously discussed, the 802.1ad and 802.1ah frame formats of steps 46 and 50 are only examples and other frame formats may be used as long as they are compatible with the remote PE devices.

For broadcast or multicast operation, the provider edge device sends the correct type of frame on each pseudowire. The PE device thus generates two types of frames (a first frame format and a second frame format). During ingress replication, the PE device sends the correct type of frame on the pseudowire, depending on the functionality of the neighbor node.

Figure 4:
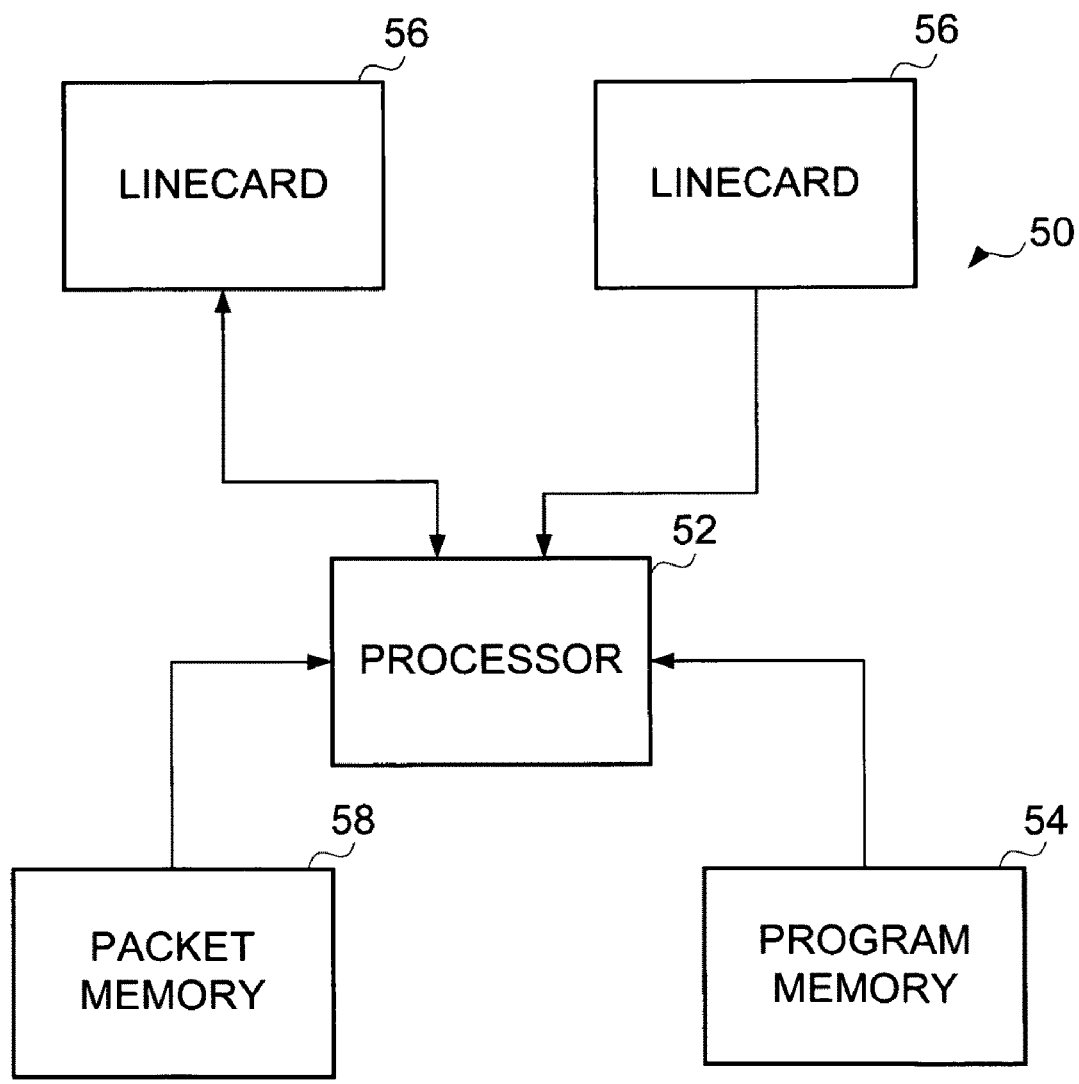
FIG. 4 depicts an example of a network device useful in implementing embodiments described herein.

FIG. 4 depicts a network device 50 that may be used to implement embodiments described herein. Network device 50 is configured to implement all of the network protocols and extensions thereof described above. In one embodiment, network device 50 is a programmable machine that may be implemented in hardware, software, or any combination thereof. Logic may be encoded in one or more tangible media for execution by a processor. For example, processor 52 may execute codes stored in a program memory 54. Program memory 54 is one example of a computer-readable medium. Program memory 54 can be a volatile memory. Another form of computer-readable medium storing the same codes is a type of non-volatile storage such as floppy disks, CD-ROMs, DVD-ROMs, hard disks, flash memory, etc.

Network device 50 interfaces with physical media via a plurality of linecards 56. Linecards 56 may incorporate Ethernet interfaces, DSL interfaces, Gigabit Ethernet interfaces, 10-Gigabit Ethernet interfaces, SONET interfaces, etc. As packets are received, processed, and forwarded by network device 50, they may be stored in a packet memory 58. To implement functionality according to the system, linecards 56 may incorporate processing and memory resources similar to those discussed above in connection with the network device as a whole. It is to be understood that the network device 50 shown in FIG. 4 and described above is only one example and that different configurations of network devices may be used.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   identifying at a local Virtual Private LAN Service Provider Edge (VPLS PE) device whether remote VPLS PE devices are configured for operation as a Provider Backbone Bridge (PBB), wherein said local VPLS PE is configured for operation as a PBB and at least one of said remote VPLS PE devices is not configured for operation as a PBB;
   negotiating pseudowire connections with said remote VPLS PE devices based on identification of said remote VPLS PE device configuration;
   receiving a frame destined for one of said remote VPLS PE devices; and
   transmitting said frame in a format compatible with said remote VPLS PE device.

2. The method of claim 1 wherein said remote VPLS PE device is configured for operation as a PBB and transmitting a frame format compatible with said remote VPLS PE device comprises transmitting an I-Tagged frame.

3. The method of claim 1 wherein said remote VPLS PE device is configured for operation as a Provider Bridge (PB) and transmitting a frame format compatible with said remote VPLS PE device comprises transmitting a VLAN tagged or untagged frame.

4. The method of claim 1 wherein said pseudowire connections with said remote VPLS PE devices configured as PBBs are I-Tagged pseudowires and said pseudowire connections with said remote VPLS PE devices not configured as PBBs are Type 4 or Type 5 pseudowires.

5. The method of claim 1 wherein identifying comprises receiving a BGP attribute during an auto-discovery process with said remote VPLS PE device.

6. The method of claim 1 wherein identifying comprises identifying whether said remote VPLS PE device is configured for operation as a PBB during negotiation of said pseudowire connection.

7. The method of claim 1 wherein receiving a frame comprises receiving a broadcast or multicast frame destined for at least two of said remote VPLS PE devices and wherein transmitting comprises transmitting a first frame format to one or more of said remote VPLS PE devices and a second frame format to one or more of said remote VPLS PE devices.

8. A local Virtual Private LAN Service Provider Edge (VPLS PE) device configured for operation as a Provider Backbone Bridge (PBB) and communication with remote VPLS PE devices, at least one of said remote VPLS PE devices not configured for operation as a PBB, the local VPLS PE device comprising:
   a processor configured to identify whether remote VPLS PE devices are configured for operation as a PBB, negotiate pseudowire connections with said remote VPLS PE devices based on configuration of said remote VPLS PE device, receive a frame destined for one of said remote VPLS PE devices, and transmit said frame in a format compatible with said remote VPLS PE device; and
   memory for storing the configuration of each of said remote VPLS PE devices.

9. The device of claim 8 wherein said remote VPLS PE device is configured for operation as a PBB and said frame format compatible with said remote VPLS PE device comprises an I-Tagged frame.

10. The device of claim 8 wherein said remote VPLS PE device is configured for operation as a Provider Bridge (PB) and said frame format compatible with said remote VPLS PE device comprises a VLAN tagged or untagged frame.

11. The device of claim 8 wherein said pseudowire connections with said remote VPLS PE devices configured as PBBs are I-Tagged pseudowires and said pseudowire connections with said remote VPLS PE devices not configured as PBBs are Type 4 or Type 5 pseudowires.

12. The device of claim 8 wherein the processor is configured for receiving a BGP attribute during an auto-discovery process with said remote VPLS PE device for use in identifying said remote VPLS PE device configuration.

13. The device of claim 8 wherein said processor is configured to identify whether said remote VPLS PE device is configured for operation as a PBB during negotiation of said pseudowire connection.

14. The device of claim 8 wherein the processor is configured to receive a broadcast or multicast frame destined for at least two of said remote VPLS PE devices and transmit a first frame format to one or more of said remote VPLS PE devices and a second frame format to one or more of said remote VPLS PE devices.

15. An apparatus comprising:
   means for identifying at a local Virtual Private LAN Service Provider Edge (VPLS PE) device whether remote VPLS PE devices are configured for operation as a Provider Backbone Bridge (PBB), wherein said local VPLS PE is configured for operation as a PBB and at least one of said remote VPLS PE devices is not configured for operation as a PBB;
   means for negotiating pseudowire connections with said remote VPLS PE devices based on identification of said remote VPLS PE device configuration;
   means for receiving a frame destined for one of said remote VPLS PE devices; and
   means for transmitting said frame in a format compatible with said remote VPLS PE device.

16. The apparatus of claim 15 wherein said remote VPLS PE device is configured for operation as a PBB and means for transmitting a frame format compatible with said remote VPLS PE device comprises means for transmitting an I-Tagged frame.

17. The apparatus of claim 15 wherein said remote VPLS PE device is configured for operation as a Provider Bridge (PB) and means for transmitting a frame format compatible with said remote VPLS PE device comprises means for transmitting a VLAN tagged or untagged frame.

18. The apparatus of claim 15 wherein said pseudowire connections with said remote VPLS PE devices configured as PBBs are I-Tagged pseudowires and said pseudowire connections with said remote VPLS PE devices not configured as PBBs are Type 4 or Type 5 pseudowires.

19. The apparatus of claim 15 wherein means for identifying comprises means for receiving a BGP attribute during an auto-discovery process with said remote VPLS PE device.

20. The apparatus of claim 15 wherein means for identifying comprises means for identifying whether said remote VPLS PE device is configured for operation as a PBB during negotiation of said pseudowire connection.

* * * * *